US 7,299,041 B2

(12) United States Patent
Narasimha et al.

(10) Patent No.: US 7,299,041 B2
(45) Date of Patent: Nov. 20, 2007

(54) METHOD AND DEVICE OF SELECTING A COMMUNICATION SYSTEM

(75) Inventors: Murali Narasimha, Raleigh, NC (US); Urban Hakansson, Chapel Hill, NC (US)

(73) Assignee: Sony Ericsson Mobile Communications AB (SE)

( * ) Notice: Subject to any disclaimer, the term of this patent is extended or adjusted under 35 U.S.C. 154(b) by 558 days.

(21) Appl. No.: 10/065,257

(22) Filed: Sep. 30, 2002

(65) Prior Publication Data

US 2004/0063427 A1   Apr. 1, 2004

(51) Int. Cl.
*H04Q 7/20* (2006.01)

(52) U.S. Cl. .............. 455/434; 455/435.2; 455/452.2; 455/515

(58) Field of Classification Search ............. 455/432.1, 455/432.2, 432.3, 434, 445, 450, 452.1, 464, 455/552, 63.1, 67.13, 435.1, 435.2, 452.2, 455/515, 552.1
See application file for complete search history.

(56) References Cited

U.S. PATENT DOCUMENTS

| | | | | |
|---|---|---|---|---|
| 5,152,002 A | * | 9/1992 | Leslie et al. .............. 455/422.1 |
| 5,517,677 A | | 5/1996 | Moon | |
| 5,524,280 A | * | 6/1996 | Douthitt et al. ................ 455/62 |
| 5,577,022 A | | 11/1996 | Padovani et al. | |
| 5,915,221 A | * | 6/1999 | Sawyer et al. .............. 455/437 |
| 5,999,816 A | * | 12/1999 | Tiedemann et al. ......... 455/437 |
| 6,047,071 A | * | 4/2000 | Shah .......................... 380/273 |
| 6,064,890 A | * | 5/2000 | Hirose et al. ................ 455/513 |
| 6,195,555 B1 | * | 2/2001 | Dent ........................ 455/456.3 |
| 6,289,220 B1 | * | 9/2001 | Spear ......................... 455/436 |
| 6,496,531 B1 | * | 12/2002 | Kamel et al. ............... 375/130 |
| 6,754,493 B1 | * | 6/2004 | Jetzek ........................ 455/436 |
| 6,771,960 B1 | * | 8/2004 | Otting et al. ............... 455/434 |
| 6,782,261 B1 | * | 8/2004 | Ahmed et al. .............. 455/436 |
| 6,842,621 B2 | * | 1/2005 | Labun et al. ............. 455/456.3 |
| 6,917,808 B1 | * | 7/2005 | Nelson ........................ 455/436 |
| 2002/0197992 A1 | * | 12/2002 | Nizri et al. .................. 455/435 |
| 2003/0017842 A1 | | 1/2003 | Moles et al. | |
| 2003/0148786 A1 | * | 8/2003 | Cooper et al. .............. 455/552 |

(Continued)

FOREIGN PATENT DOCUMENTS

CA    2 325 077    5/2002

(Continued)

OTHER PUBLICATIONS

Patent Cooperation Treaty, International Search Report, pp. 1-4.

(Continued)

*Primary Examiner*—Duc M. Nguyen
*Assistant Examiner*—Anthony S. Addy
(74) *Attorney, Agent, or Firm*—Charles L. Moore; Moore & Van Allen, PLLC

(57) ABSTRACT

A method of selecting a communication system is disclosed. The method includes receiving at least a quality indicator for a channel; scanning any channels on a channel scan list in response to at least the quality indicator of the channel being below a predetermined threshold value; and acquiring another channel from the channel scan list in response to the other channel having at least the quality indicator greater than or equal to the predetermined threshold value.

29 Claims, 5 Drawing Sheets

U.S. PATENT DOCUMENTS

| | | | |
|---|---|---|---|
| 2004/0116133 A1* | 6/2004 | Kalhan et al. | 455/456.2 |
| 2004/0127220 A1* | 7/2004 | Proctor, Jr. | 455/442 |
| 2004/0203745 A1* | 10/2004 | Cooper | 455/432.1 |
| 2004/0203839 A1* | 10/2004 | Ostberg et al. | 455/455 |

FOREIGN PATENT DOCUMENTS

| | | |
|---|---|---|
| EP | 0 605 989 A1 | 7/1994 |
| EP | 0605989 A1 * | 7/1994 |
| GB | 2 333 424 A | 7/1999 |

OTHER PUBLICATIONS

PCT International Preliminary Examination Report dated Feb. 16, 2005 for corresponding PCT application (PCT/US03/30665).

European Patent Office, Application No. 03754966.4, First Office Action dated Sep. 19, 2005 for corresponding European application.

European Patent Office, Application No. 03754966.4, Second Office Action dated Apr. 28, 2006 for corresponding European patent application.

* cited by examiner

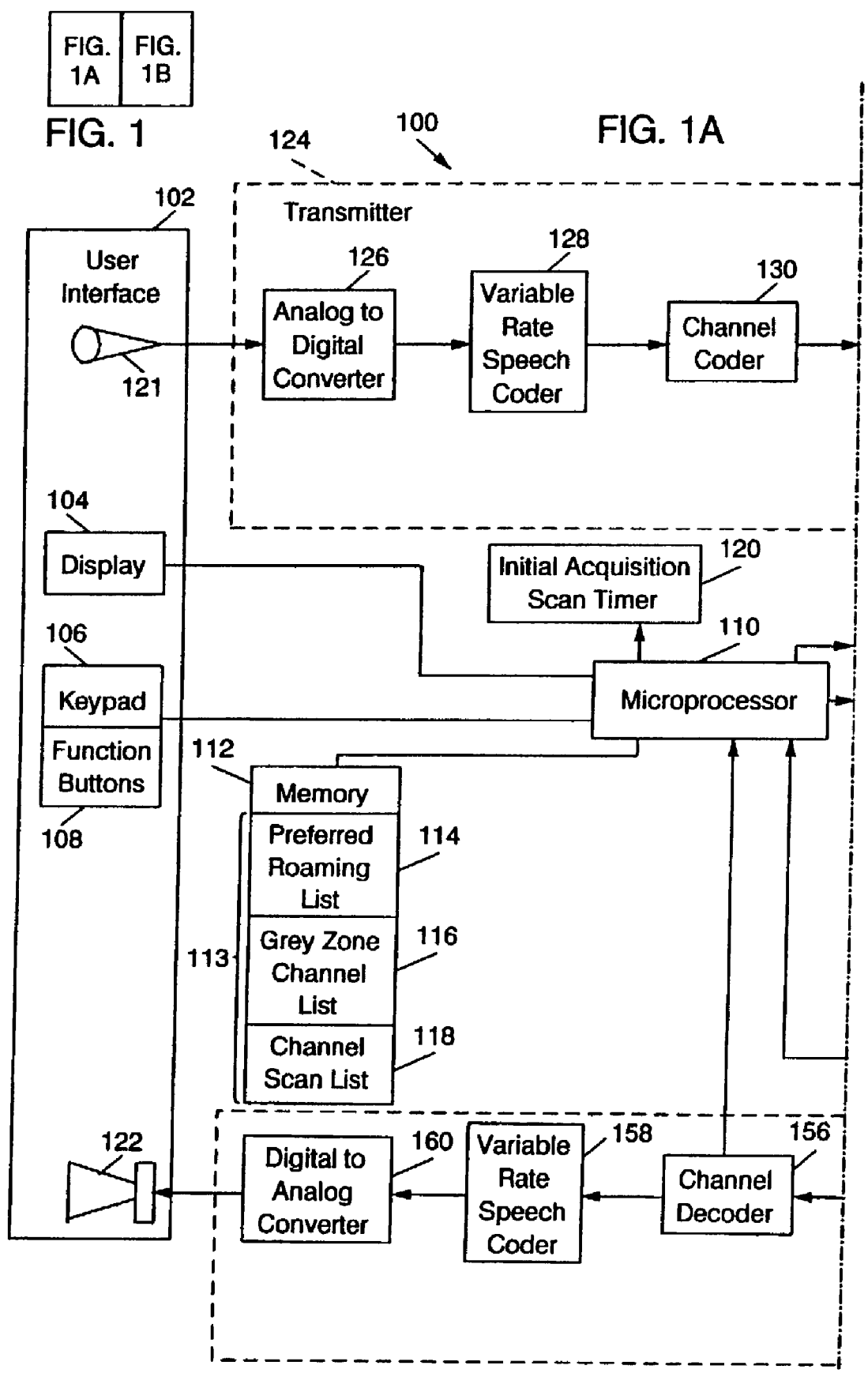

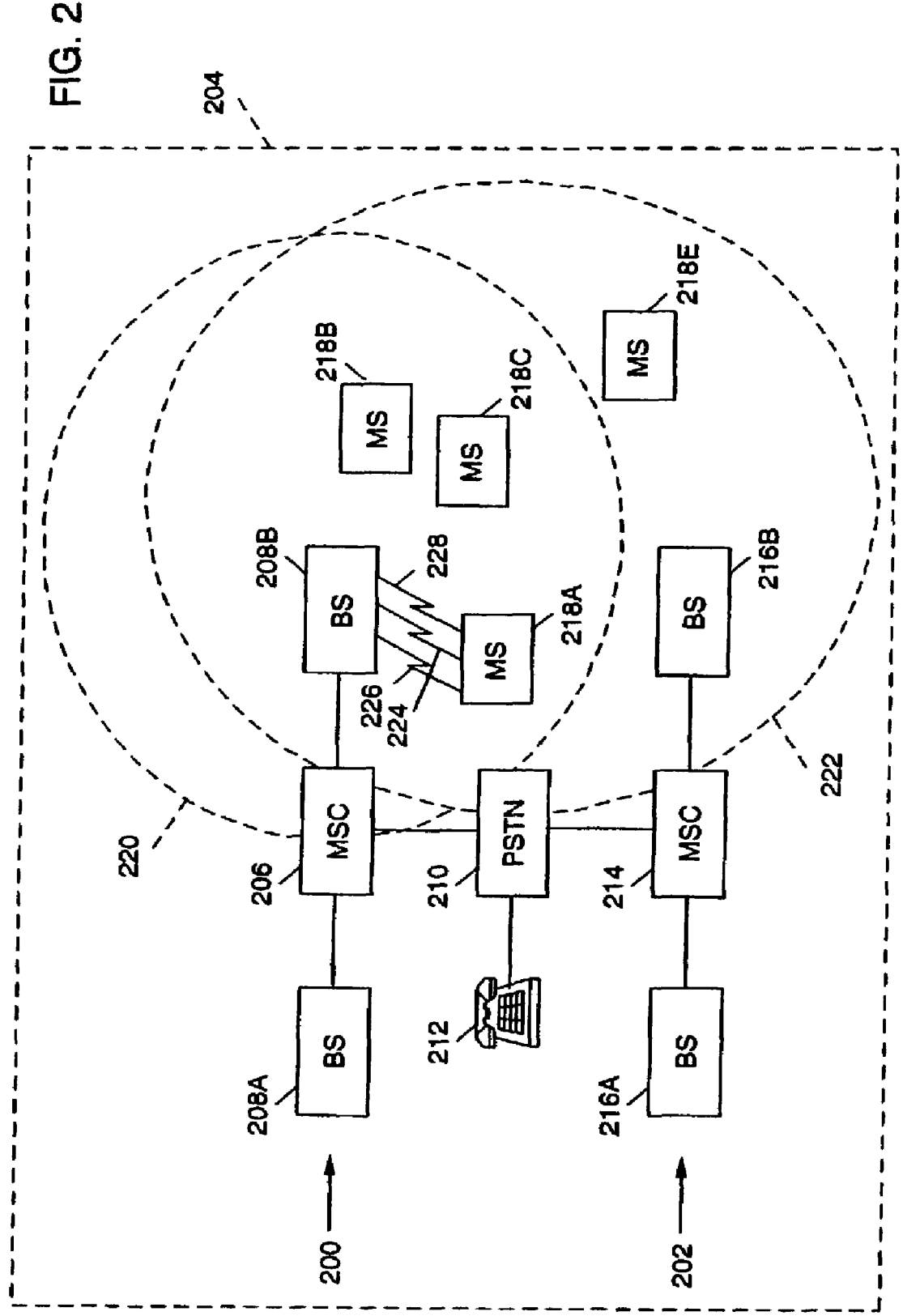

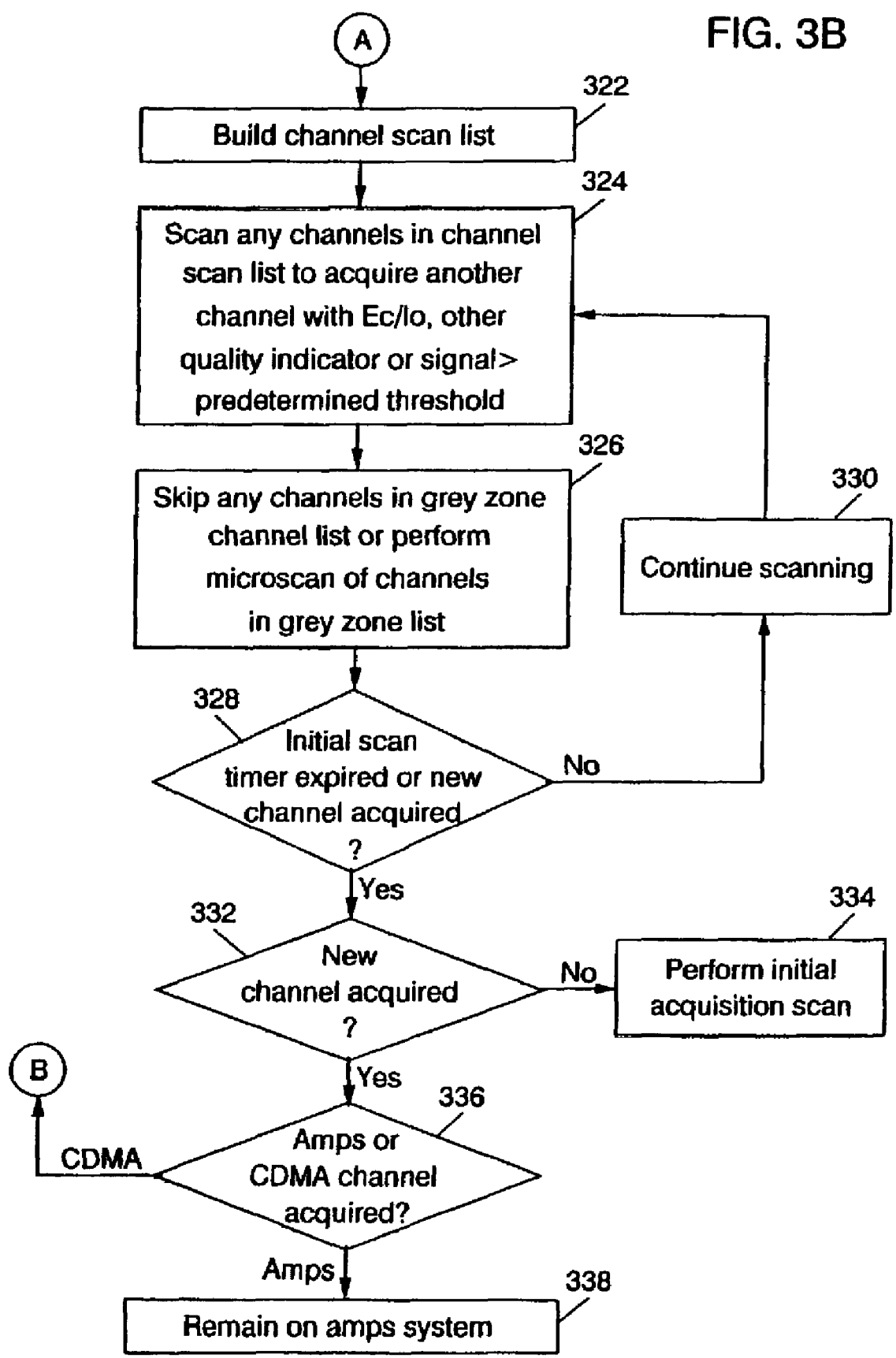

METHOD AND DEVICE OF SELECTING A COMMUNICATION SYSTEM

BACKGROUND OF INVENTION

Field of the Invention

The present invention relates to communications and more particularly to a method and device of selecting a communication system in a grey zone or the like.

Mobile communication systems, such as code division multiple access (CDMA) cellular communication systems and the like, may be limited in capacity by the mobile station or mobile terminal to base station communication path or link or the reverse link. As the number of mobile stations in a cell of a cellular mobile communication system increases, the quality of communications degrades in the reverse link more quickly than degradation in the forward link or communication path from the base station to the mobile station. The mobile station may be able to receive pages on the forward link, but a page response or access attempt on the reverse link may fail because of interference from other mobile stations communicating within the cell. This may be referred to as a grey zone condition. Under such conditions, the mobile station may not have sufficient signal strength or transmit power level on the forward link to hold on to a paging channel to which it is tuned. The paging channel could be temporarily lost but not for such a time period that the mobile station determines that the system may be lost and that a system reselection process needs to occur. The mobile station temporarily losing the paging channel can result in the mobile station failing to receive incoming calls. Although the mobile station senses the availability of service and a sufficiently strong signal, the mobile station may be unable to receive or respond to a page. Outgoing calls may also fail. If the forward link is such that receipt of the paging channel by the mobile station is frequently interrupted, there is a very high likelihood that an access attempt on the reverse link will fail and eventually the system may be lost. The grey zone condition described above can occur when a mobile station first powers up and acquires a most preferred system from a preferred roaming list (PRL) or the mobile station moves or roams into a cell or area and experiences the grey zone condition.

Accordingly, there is a need to provide a method and communication device to avoid the grey zone condition. Additionally, there is a need to provide a method and communication device to facilitate selecting another communication channel or system when a mobile station acquires a most preferred system with frequent interruptions in the forward link or when the mobile station moves or roams into a grey zone condition.

SUMMARY OF INVENTION

In accordance with an embodiment of the present invention, a method of selecting a communication system may include receiving at least a quality indicator for a channel. Any channels on a channel scan list may be scanned in response to at least the quality indicator of the channel being below a predetermined threshold value, and another channel from the channel scan list may be acquired in response to the other channel having at least the quality indicator greater than or equal to the predetermined threshold value.

In accordance with another embodiment of the present invention, a method of selecting a communication system includes monitoring an $E_c/I_o$ (ratio of chip energy to interference energy) of a CDMA pilot channel. Any channels on a channel scan list may be scanned to acquire another communication system in response to the $E_c/I_o$ of the CDMA pilot channel remaining below a predetermined threshold for a predetermined period of time.

In accordance with a further embodiment of the present invention, a communication device includes a receiver to receive at least a quality indicator for a channel, a channel scan list and a microprocessor. The microprocessor may be adapted to cause scanning of any channels in the channel scan list in response to at least the quality indicator of the channel being below a predetermined threshold value. The microprocessor may be further adapted to acquire another channel from the channel scan list in response to the other channel having at least the quality indicator greater than the predetermined threshold value.

In accordance with a further embodiment of the present invention, a computer-readable medium having computer-executable instructions for performing a method is provided. The method may include receiving at least a quality indicator for a channel. Any channels on a channel scan list may be scanned in response to at least the quality indicator of the channel being below a predetermined threshold value; and another channel from the channel scan list may be acquired in response to the other channel having at least a quality indicator greater than or equal to the predetermined threshold value.

BRIEF DESCRIPTION OF DRAWINGS

FIGS. 1A and 1B are a block diagram of an example of a communication device in which communication system selection may be implemented in accordance with an embodiment of the present invention.

FIG. 2 is an example of a plurality of communication systems in a geographical area in which communication system selection may be implemented in accordance with an embodiment of the present invention.

FIGS. 3A and 3B are a flow chart of a method to perform selection of a communication system in accordance with an embodiment of the present invention.

DETAILED DESCRIPTION

The following detailed description of preferred embodiments refers to the accompanying drawings which illustrate specific embodiments of the invention. Other embodiments having different structures and operations do not depart from the scope of the present invention.

Figure 1B:
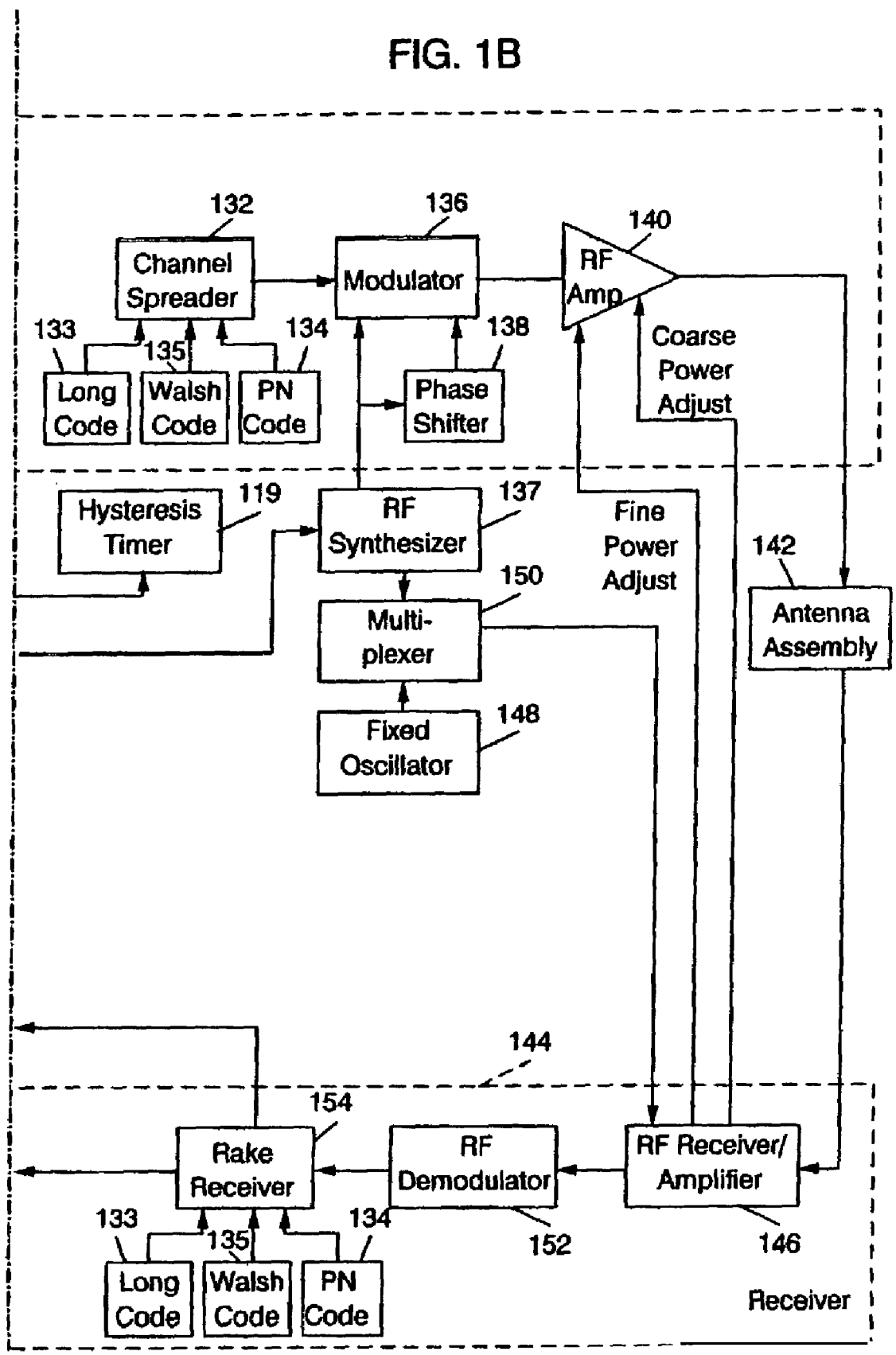

FIGS. 1A and 1B are a block diagram of an example of a communication device 100 in which communication system selection may be implemented in accordance with an embodiment of the present invention. The communication device 100 shown in FIGS. 1A and 1B is an example of a CDMA mobile station or cellular phone. However, the present invention may also be applicable to other types of communication devices and communication standards.

The communication device 100 may have an operator or user interface 102 (FIG. 1A) to facilitate controlling operation of the communication device 100 including initiating and conducting phone calls and the like. The user interface 102 may include a display 104 to provide visual signals to the subscriber or user as to the status and operation of the communication device 100. The user interface 102 may also include a keypad 106 and function buttons 108, soft keys or the like. The display 104, keypad 106 and function buttons 108 may be coupled to a microprocessor 110 or the like. The microprocessor 110 may manage overall operation of the communication device 100 under stored program control using software programs that may be stored in a memory 112. The memory 112 or other data storage device or devices 113 may store a preferred roaming list 114, a grey zone channel list 116 and a channel scan list 118. The preferred roaming list 114 is a database that may include systems and channels in different geographical areas that are preferred systems or channels for the communication device 100 to acquire and to communicate over because of more favorable roaming charges, fees or the like. There may also be other reasons why a particular system or channel is in the preferred roaming list 114. The systems and channels in the preferred roaming list 114 may be listed in order of preference or desirability, so that the communication device 100 will scan and attempt to acquire those systems or channels before others in a particular geographical area.

The grey zone list 116 may include those channels or systems that are evaluated by the communication device 100 as possibly causing a grey zone condition or whose operating parameters or indicators of communication quality or reliability may fall below predetermined threshold values or a grey zone threshold value. Examples of such communication quality indicators or reliability indicators may include received chip energy to interference noise ratio ($E_C/I_O$) of a pilot channel, received signal strength indicator (RSSI) or the like. The grey zone channel list 116 may include a record of the channel number and frequency of any channels placed on the grey zone list 116. An $E_C/I_O$, RSSI or other communication quality indicator or parameter associated with the channel may also be recorded on the list 116.

In a CDMA communication system, each bit of digital information or data may be coded into multiple chips of radio frequency energy that are transmitted over-the-air. Hence the chip energy to interference noise energy ratio ($E_C/I_O$) of a CDMA pilot channel is a measure or indicator of the communication quality or reliability of the CDMA system for the geographical location where the communication device 100 may be located at the time. The grey zone list 116 is a dynamic list because the communication device 100 may move from one geographical location to another and the conditions of the communication environment can differ from one location to another and over time as more or fewer communication devices communicate on a particular base station. When identification information for a channel is added to the grey zone channel list 116, a timing parameter may be associated with the channel in the list 116. The list 116 may be reviewed at selected time intervals and any channels with an expired timing parameter may be removed from the list 116 and made available for acquisition. Accordingly, channels in the grey zone channel list 116 may have a settable life during which they remain in the list 116. Grey zone behavior or conditions are dynamic and can vary with both time and geography. Setting the duration that a channel remains on the grey zone channel list 116 enables the communication device 100 to reacquire a more preferred communication system or channel that may have been placed in the grey zone list 116 because of a grey zone condition at a particular time or location of the device 100.

The predetermined threshold values or grey zone threshold values may be programmed into the communication device 100 at the time of manufacture or at any time. A communication service provider or carrier may program or reprogram the predetermined threshold values or grey zone threshold values by using known handset programming tools. Enhancements may be made to the over-the-air provisioning or programming standards to permit such threshold values or parameters to be programmed over-the-air.

The channel scan list 118 may include a group of channels for systems available in a geographical area that the communication device 100 can scan to initially acquire service in the geographical area, or to look for a new system or channel with better communication parameters or performance characteristics. For example, after the communication device 100 determines that it is in a possible grey zone, the communication device 100 may build the channel scan list 118 to look for a channel of an alternative system.

The communication device 100 may also include a hysteresis timer 119 or the like (FIG. 1B). The hysteresis timer 119 may be part of or incorporated into the microprocessor 110 or may be a separate component. As will be discussed in more detail below, the hysteresis timer 119 may be started when $E_C/I_O$, received signal strength or other communication quality indicator or signal falls below the predetermined threshold value or grey zone threshold value. After the hysteresis timer 119 expires or after a predetermined time period, $E_C/I_O$ or other indicator may be checked again for the current channel. If $E_C/I_O$ or other indicator is still below the predetermined threshold, the channel number and frequency or other identifier of the current channel may be added to or recorded in the grey zone channel list 116, and the channel scan list 118 (FIG. 1A) may be built and scanned for a new channel and system having an $E_C/I_O$ or other quality indicator above the predetermined threshold. Therefore, the hysteresis timer 119 may cause the communication device 100 to scan any channels on the channel scan list 118 in response to at least $E_C/I_O$ or other quality indicator of the current channel being below the predetermined threshold value for a predetermined period of time.

$E_C/I_O$, received signal strength or other indicator may vary rapidly as the communication device 100 moves about. Accordingly, confirming that $E_C/I_O$ received signal strength or other quality indicator consistently remains below the predetermined threshold for the predetermined time period prevents the communication device 100 from hopping between channels each time $E_C/I_O$ or other quality indicator may momentarily fall below the threshold value.

The communication device 100 may also include an initial acquisition scan timer 120 (FIG. 1A). As described in more detail below, the initial acquisition scan timer 120 may be started after a current channel is added to the grey zone channel list 116 and before the communication device 100 scans to acquire a new channel or system. If the initial acquisition scan timer 120 expires before the new channel or system is acquired, an initial acquisition scan may be performed by the communication device 100. Accordingly, the initial scan timer 120 may cause the communication device 100 to conduct an initial acquisition scan in response to the communication device 100 failing to acquire another channel from the channel scan list 118 after a selected period of time. An initial acquisition scan is substantially a complete scan of available channels that the communications device 100 may perform when first powered-up. The initial acquisition scan timer 120 may be part of or incorporated into the microprocessor 110 or may be a separate component.

The hysteresis timer 119 and the initial acquisition scan timer 120 may each be programmed during manufacturing or at any other time. A communication service provider or carrier may program or reprogram the hysteresis timer 119 and the initial acquisition scan timer 120 by using known handset programming tools, such as over-the-air programming or the like.

The user interface 102 may also include a microphone 121 and a speaker 122. The microphone 121 may be connected to a transmitter 124 to convert audio signals from a subscriber into pulse code modulated (PCM) signals for transmission over the air. The transmitter 124 may include an analog-to-digital converter (ADC) 126 connected to the microphone 120 and the ADC 126 may be connected to a variable rate speech coder 128. The variable rate speech coder 128 may compress the digital signals from the ADC 126 into blocks of data. The variable rate speech coder 128 may be connected to a channel coder 130 that may perform a ⅓ rate convolutional coding of the signal blocks, add control information and interleave the blocks to produce a baseband data signal. The baseband data signal may be applied to a channel spreader 132 (FIG. 1B). The channel spreader 132 may exclusive OR the baseband data signal with a unique subscriber code that may be referred to as a long code 133 to produce a private data signal. The data signal may be multiplexed or spread by a PseudoNoise (PN) code 134 and a Walsh code 135 that may be provided by the microprocessor 110. The PN code 134 spreads the signal so that it is unique to other radio channels in the CDMA system and the Walsh code 135 provides the unique code which identifies the communication device 100 from other devices operating on the same radio channel. The resultant spread data signal may be applied to a modulator 136. The modulator 136 may be an offset quadrature phase shift keying (O-QPSK) type modulator. The modulator 136 may mix the spread data signal with a radio signal from a radio frequency (RF) synthesizer 137 and a phase shifted signal from a phase shifter 138 to provide an RF signal at a desired frequency. The RF signal may be boosted by an RF amplifier 140 for transmission by an antenna assembly 142. The gain of the RF amplifier 140 may be course adjusted by the receive signal level and fine adjusted by a control signal that may be received from a base station (not shown in FIG. 1).

A radio signal received by the antenna assembly 142 may be down converted by a receiver 144 (FIG. 1B) and applied to the speaker 122 (FIG. 1A) to produce an audio signal for the subscriber or user. The receiver 144 may include an RF receiver amplifier 146 connected to the antenna assembly 142 (FIG. 1B). A signal from a fixed RF oscillator 148 may be mixed by a multiplexer 150 with a signal from the RF synthesizer 137 to produce a reference frequency that may be applied to the RF receiver amplifier 146 for frequency down-conversion. An output signal from the RF receiver amplifier 146 may be digitized by an RF demodulator 152 and supplied to a rake receiver 154. The rake receiver 154 may include a plurality of correlators (not shown in FIG. 1B) that may digitally decode the primary and delayed signals. A channel decoder 156 (FIG. 1A) may extract data and control information from the signal from the rake receiver 154 (FIG. 1B). The control information may be sent to the microprocessor 110 and the data information or blocks may be sent to a variable rate speech decoder 158. The speech decoder 158 may convert the data blocks into a PCM signal and a digital-to-analog converter 160 may convert the PCM signal to an analog signal that may be produced into an audio signal by the speaker 122.

FIG. 2 is an example of a plurality of communication systems in a geographical area in which communication system selection may be implemented in accordance with an embodiment of the present invention. A first communication system 200 and second communication system 202 may provide wireless or cellular communication service in a common geographical area 204. The first communication system 200 and the second communication system 202 may each be a CDMA communication system or the like. The first communication system 200 may include at least one mobile switching center (MSC) 206. The first MSC 206 may be connected to one or a plurality of base stations (BS) 208A and 208B. The MSC 206 may switch communication signals or telephone calls between the base stations 208 or between the base stations 208 and a public switched telephone network (PSTN) 210. The PSTN 210 may route communication signals or phone calls to a fixed telephone station or terminal 212 or to a MSC 214 of the second communication system 202. The MSC 214 of the second system 202 may be connected to one or a plurality of base stations 216A and 216B.

The base station 208B of the first communication system 200 may provide wireless or cellular communications to communication devices or mobile stations 218 located within a smaller geographical area 220 within the larger geographical area 204. The smaller geographical area 220 may be referred to as a cell. The base station 216B of the second communication system 202 may provide cellular communications to mobile stations 218 within another cell 222. Each of the mobile stations 218 may be similar to the communication device 100 in FIG. 1.

The cells 220 and 222 may overlap or may have a substantially similar footprint or coverage area. The first communication system 200 may be a CDMA communication system operating around the 800 MHz band and the second communication system 202 may be a CDMA communication system operating around the 1900 MHz band. When a mobile station 218 moves into the cell 220 or first powers-up, the mobile station 218 will perform an initial acquisition scan to obtain wireless communications within the geographical area of cell 220. The mobile station 218 may scan for communication channels of systems serving the cell 220 according to a preferred roaming list, such as list 114 in FIG. 1A, to find a preferred system. If system 200 is a preferred CDMA system, a mobile station 218A may first scan for a CDMA pilot channel 224. After acquiring the pilot channel 224, the mobile station 218A may synchronize with the system 200 and update its communication parameters and channel decoding parameters from a CDMA synchronization channel 226. Even though the mobile station 218A may acquire a most preferred system, the quality of communication in a reverse link (from mobile station 218A to BS 208B) may degrade as the number of mobile stations 218 in the cell 220 increases creating a grey zone condition. The mobile station 218A may be able to receive pages on the forward link (from BS 208B to mobile station 218A), but a page response or access attempt on the reverse link may fail because of interference from other mobile stations 218 within the cell 220. Under grey zone conditions, the mobile station 218A may not have sufficient signal strength or transmit power because of power control measures within the CDMA system 200 to hold on to a paging channel 228.

Figure 3A:
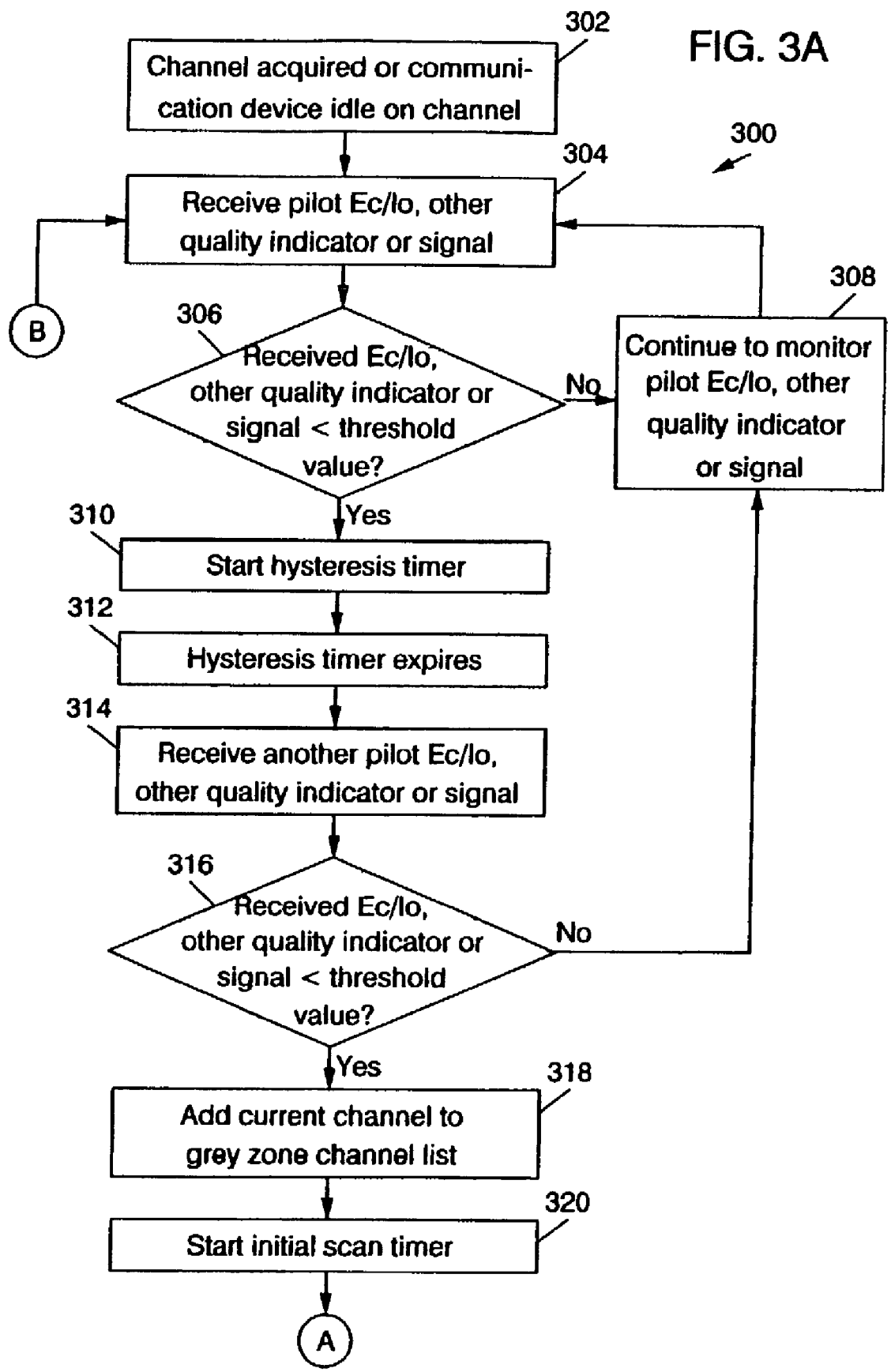

FIGS. 3A and 3B are a flow chart of a method 300 to perform selection of a communication system in accordance with an embodiment of the present invention to avoid a grey zone condition or the like. The method 300 may be performed by a communication device like the communication device 100 of FIGS. 1A and 1B or mobile station 218 in FIG. 2. In block 302, the communication device 100 may acquire a CDMA channel or the like or the communication device 100 may be idle on a communication channel. In block 304, the communication device 100 or mobile station 218 may receive at least a pilot $E_c/I_o$ on a CDMA pilot channel or at least another quality indicator or signal from a communication system, such as communication system 200 in FIG. 2.

In block 306, a determination may be made if the received pilot $E_C/I_O$ or other quality indicator or signal is less than a predetermined threshold value or grey zone threshold value. If the received pilot $E_C/I_O$ or other quality indicator or signal is not less than the predetermined threshold value, the method 300 may move to block 308 and the communication device 100 or mobile station 218 may continue to monitor the pilot $E_C/I_O$ or other quality indicator or signal from the system 200.

If the received signal in block 304 is less than the predetermined threshold value or grey zone threshold value in block 306, the method 300 may advance to block 310 and a hysteresis timer or the like may be started. The hysteresis timer may be the same as the timer 119 in FIG. 1B. When the hysteresis timer expires in block 312 or after a predetermined time delay, the communication device 100 or mobile station 218 may receive at least another pilot $E_C/I_O$ or other quality indicator or signal in block 314. If at least the other received pilot $E_C/I_O$ or other quality indicator is not below the predetermined threshold value in decision block 316, the method 300 may continue to monitor at least the pilot $E_C/I_O$ or other quality indicator in block 308. If the other received pilot $E_C/I_O$ or other quality indicator is below the predetermined threshold value in decision block 316, the method 300 may advance to block 318. In block 318, the current channel to which the communication device 100 or mobile station 218 is tuned may be added to a grey zone channel list, such as grey zone channel list 116 in FIG. 1. When a channel is added to the grey zone channel list 116, the channel number may be recorded with the frequency, the RSSI and other communication parameters in the list 116. Because the communication environment may change over time and as the mobile station 218 moves about within the cell 220 or system 200 (FIG. 2), a channel recorded in the grey zone channel list 116 may have a settable life or timing parameter associated with it, and the channel may be removed from the grey zone channel list 116 (FIG. 1) after a predetermined period of time and made available again for acquisition by the communication device 100 or mobile station 218.

Under some circumstances, a system may send a global action message, service redirection message or the like to a mobile station to inform the mobile station that CDMA service or other communication service is available on a specific channel. If that channel is in the grey zone channel list of the mobile station, the mobile station may be programmed to not attempt to acquire communication service on that channel.

After adding the current channel to the grey zone channel list in block 318, an initial scan timer, such as initial scan timer 120 in FIG. 1A, may be started in block 320, and a channel scan list may be built or created in block 322 (FIG. 3B). The channel scan list may be the same as the channel scan list 118 in FIG. 1A. The channel scan list may include channels on alternate communication systems, such as system 202 in FIG. 2, and the channel scan list may include a preferred roaming list, such as the preferred roaming list 114 in FIG. 1A. The channel scan list may be built from a system table and then referencing from the system table into an acquisition table (not shown in the Figures). The system table and acquisition table may be stored in the memory 112 or other data storage device 113 of the communication device 100 (FIG. 1A). The system table may be divided into geographical areas and may contain system identifications for systems in each geographical area. The communication device 100 determines the geographical area where it is located and then enters the acquisition table for specific channels for those systems in the system table for the specific geographical area. Channels may be selected from the acquisition table and placed on the channel scan list in an order based on predetermined rules so that the channels may be scanned in order of preference to minimize channel acquisition time.

In block 324 the communication device 100 or mobile station 218 may scan any channels in the channel scan list to acquire an alternate channel with a pilot $E_C/I_O$ signal or other quality indicator signal greater than or equal to the predetermined threshold value. The communication device 100 may scan any channels in the channel scan list in a selected order, such as scanning the preferred roaming list 114 (FIG. 1A) in order of preference first. While scanning, the communication device 100 or mobile station 218 may skip any channels in the grey zone channel list 116 (FIG. 1A). In another embodiment of the present invention, the communication device 100 or mobile station 218 may perform a microscan of any channels in the grey zone channel list 116 in block 326. The microscan may include receiving a received signal strength indication (RSSI) or other communication parameter for a channel in the grey zone channel list 116. The RSSI or other communication parameter may be compared to one of a chosen threshold value or alternatively, the RSSI or other parameter may be compared to a previously received RSSI or other parameter for the channel that may be stored with the channel information in the grey zone channel list. If the RSSI or other parameter equals or exceeds the chosen threshold value or the RSSI or other parameter has improved by a predetermined level or amount compared to the previously received RSSI or other parameter, the associated channel may be able to provide adequate communication service without a possibility of entering a grey zone condition. A more complete scan or evaluation of the channel may be performed before the channel is acquired by the communication device 100 or mobile station 218.

If the communication device 100 or mobile station 218 receives or initiates a call during the scanning process or prior to acquiring a new channel, the communication device 100 or mobile station 218 may conduct an initial acquisition scan upon call release. An initial acquisition scan is a more complete scan similar to that performed when the communication device 100 first powers-up. The initial acquisition scan may include all channels that the device 100 has most recently used including any channels in the grey zone channel list 116 because during the phone call, the communication device 100 may have moved and the communication environment may have changed.

In decision block 328, a determination may be made whether the initial scan timer has expired after a selected time period or a new channel has been acquired. If neither the initial scan timer has expired or a new channel has been acquired, the method 300 may continue to scan in block 330 and returns to block 324. If the initial scan timer has expired or a new channel has been acquired, the method 300 may advance to block 332 where a determination is made if a new channel has been acquired or only the initial scan timer has expired. If a new channel has not been acquired, an initial acquisition scan may be performed in block 334. If a new channel has been acquired, a determination may be made in block 336 if an advanced mobile phone service (AMPS) or CDMA channel has been acquired. If a CDMA channel is acquired, the method 300 returns to block 304 (FIG. 3A). If an AMPS channel is acquired, the communication device 100 or mobile station 218 may remain on the AMPS system in block 338 until there may be a need to scan for another system or channel.

The method 200 may be embodied in a computer readable medium or electronic readable medium, such as memory 112 (FIG. 1) or the like, having computer-executable instructions for performing the method 300. The computer readable medium may include any type of memory, such as flash memory, floppy disk, compact disc-read only memory (CD-ROM), nonvolatile ROM, random access memory (RAM) or the like.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of selecting a communication system, comprising:
   receiving a first quality indicator for a current channel by a mobile communication device from a current communication system;
   remaining in communication with the current system;
   receiving a second quality indicator for the current channel after a predetermined time period in response to the first quality indicator being below a predetermined threshold value;
   adding the current channel to a grey zone channel list in a mobile communication device in response to the second quality indicator being below the predetermined threshold value to avoid a grey zone condition, wherein the grey zone condition includes the mobile communication device being able to receive a page on a forward link from the current communication system to the mobile communication device, but a page response or a system access attempt on a reverse link failing because of insufficient transmit power in the mobile communication device caused by a power control measure of the current communication system which permits interference from other mobile communication devices operating on the current communication system;
   scanning any channels in a channel scan list in response to the second quality indicator being below the predetermined threshold value;
   skipping any channels on the grey zone channel list during scanning to avoid the grey zone condition; and
   acquiring a new channel from the channel scan list in response to the new channel having an associated quality indicator greater than or equal to the predetermined threshold value.

2. The method of claim 1, wherein the first and second quality indicators each comprise an $E_C/I_O$ of a code division multiple access (CDMA) pilot channel.

3. The method of claim 1, wherein scanning any channels in the channel scan list comprises scanning at least channels in a preferred roaming list.

4. The method of claim 1, further comprising:
   starting a hysteresis timer in response to the first quality indicator being below the predetermined threshold value; and receiving the second quality indicator after the hysteresis timer expires.

5. The method of claim 1, further comprising performing an initial acquisition scan in response to failing to acquire the new channel having the associated quality indicator greater than or equal to the predetermined threshold value.

6. The method of claim 1, further comprising:
   starting an initial scan timer before scanning any channels in the channel scan list; and
   performing an initial acquisition scan in response to the initial scan timer expiring and failure to acquire the new channel having the associated quality indicator greater than or equal to the predetermined threshold value.

7. The method of claim 1, wherein acquiring the new channel comprises acquiring one of a CDMA channel or an Advanced Mobile Phone Service (AMPS) channel.

8. The method of claim 1, further comprising building the channel scan list, wherein the channel scan list includes channels on alternate systems.

9. The method of claim 1, further comprising removing a channel from the grey zone channel list in the mobile communications device after the channel has been in the grey zone channel list for a predefined period of time.

10. The method of claim 1, wherein scanning any channels in the channel scan list comprises performing a microscan of any channels on the grey zone channel list.

11. The method of claim 10, wherein performing a microscan comprises:
    receiving a received signal strength indication (RSSI) for a selected channel in the grey zone channel list; and
    comparing the RSSI to one of a threshold value or a previously received RSSI for the selected channel.

12. The method of claim 1, further comprising programming the predetermined threshold value over-the-air.

13. The method of claim 1, further comprising preventing hopping between different channels by confirming that the first quality indicator remains below the predetermined threshold for the predetermined time period by receiving the second quality indicator from the same channel.

14. The method of claim 1, wherein acquiring another channel from the channel scan list comprises acquiring another channel of a new communication system operating in a common geographical area with the current communication system.

15. A method of selecting a communication system, comprising:
    receiving a first $E_C/I_O$ of a CDMA pilot channel below a grey zone threshold value from a current communication system;
    remaining in communication with the current communication system;
    receiving a second $E_C/I_O$ of the CDMA pilot channel before scanning any channels in a channel scan list to acquire another communication system; adding the CDMA pilot channel to a grey zone channel list in a mobile communication device in response to the second $E_C/I_O$ indicator being below a grey zone threshold value to avoid a grey zone condition, wherein the grey zone condition includes the mobile communication device being able to receive a page one a forward link from the current communication system to the mobile communication device, but a page response or a system access attempt on a reverse link failing because of insufficient transmit power in the mobile communication device caused by a power control measure of the current communication system which permits interference from other mobile communication devices operating on the current communication system; and scanning any channels on a channel scan list to acquire a new communication system different from the current communication system and operating in a common geographical area with the current communication system to avoid the grey zone condition in the current communication system in response to the second $E_C/I_O$ of the CDMA pilot channel being below the grey zone threshold value;

skipping any channels on the grey zone channel list during scanning to avoid the grey zone condition; and acquiring a new channel from the channel scan list in response to the new channel having an associated $E_C/I_O$ greater than the grey zone threshold value.

16. The method of claim 15, further comprising performing an initial acquisition scan in response to failing to acquire the new communication system.

17. The method of claim 15, further comprising removing the CDMA pilot channel from the grey zone channel list after the CDMA pilot channel has been on the grey zone list for a predetermined period of time.

18. The method of claim 15, wherein scanning any channels on the channel scan list comprises performing a microscan of any channels on the grey zone list in lieu of skipping any channels on the grey zone list to avoid the grey zone condition.

19. The method of claim 15, further comprising performing an initial acquisition scan after terminating a telephone call originated before acquiring the other communication system.

20. A communication device, comprising:
a receiver to receive a first quality indicator for a channel and a second quality indicator for the channel after a predetermined period of time in response to the first quality indicator being below a predetermined threshold value, wherein the first and second quality indicators are received from a current communication system and the communication device remains in communication with the current communication system during the predetermined period of time;
a channel scan list;
a grey zone channel list, wherein the grey zone channel list includes any channels where the first quality indicator and the second quality indicator are below the predetermined threshold value to avoid a grey zone channel condition, wherein the grey zone channel condition includes the mobile communication device being able to receive a page on a forward link, but failing a page response or an access attempt on a reverse link from the communication device to a base station caused by insufficient transmit power in the mobile communication device resulting from a power control measure of the current communication system, wherein the insufficient transmit power permits interference from other mobile stations operating in the current communication system; and
a microprocessor adapted to cause scanning of any channels on the channel scan list and to skip any channels on the grey zone channel list in response to the second quality indicator of the channel being below the predetermined threshold value.

21. The communication device of claim 20, wherein the microprocessor is adapted to acquire another channel from the channel scan list in response to the new channel having an associated quality indicator greater than or equal to the predetermined threshold value, wherein the new channel is for a new communication system operating in a common geographical area with the current communication system.

22. The communication device of claim 20, wherein the quality indicators each comprise an $E_C/I_O$ of a code division multiple access (CDMA) pilot channel.

23. The communication device of claim 20, wherein the channel scan list comprises a preferred roaming list.

24. The communication device of claim 20, further comprising a timer to cause the scanning of any channels on the channel scan list in response to the second quality indicator of the channel being below the predetermined threshold for the predetermined period of time.

25. The communication device of claim 20, further comprising an initial scan timer to cause an initial acquisition scan in response to a failure to acquire a new channel from the channel scan list after a selected period of time.

26. A computer-readable medium having encoded computer-executable instructions for performing a method, comprising:
receiving a first quality indicator for a channel from a current communication system;
remaining in communication with the current communication system;
receiving a second quality indicator for the channel after a predetermined time period in response to the first quality indicator being below a predetermined threshold value;
adding the current channel to a grey zone channel list in a mobile communication device in response to the second quality indicator being below the predetermined threshold value to avoid a grey zone condition, wherein the grey zone condition includes the mobile communication device being able to receive a page on a forward link from the current communication system to the mobile communication device, but a page response or a system access attempt on a reverse link failing because of insufficient transmit power in the mobile communication device caused by a power control measure of the current communication system which permits interference from other mobile communication devices operating on the current communication system;
scanning any channels in a channel scan list in response to the second quality indicator being below the predetermined threshold value;
skipping any channels on the grey zone channel list during scanning to avoid the grey zone condition; and
acquiring a new channel from the channel scan list in response to the new channel having an associated quality indicator greater than or equal to the predetermined threshold value.

27. The computer-readable medium having encoded computer-executable instructions for performing the method of claim 26, wherein the quality indicators each comprise an $E_C/I_O$ of a code division multiple access (CDMA) pilot channel.

28. A method of selecting a communication system, comprising:
receiving a first quality indicator for a channel from a current communication system;
remaining in communication with the current system;
receiving a second quality indicator for the channel after a predetermined time period in response to the first quality indicator being below a predetermined threshold value;
adding the channel to a grey zone channel list in response to the second quality indicator being below the predetermined threshold value, wherein the grey zone channel list includes any channels having a reverse link from a mobile communication device to a base station being degradable by interference from other mobile communication devices;

scanning any channels in a channel scan list in response to the second quality indicator being below the predetermined threshold value to acquire a new communication system different from the current communication system and operating in a common geographical area with the current communication system to avoid a grey zone condition in the current communication system, wherein the grey zone condition includes the mobile communication device being able to receive a page on a forward link from the current communication system to the mobile communication device, but a page response or a system access attempt on the reverse link failing because of insufficient transmit power in the mobile communication device caused by a power control measure of the current communication system which permits interference from other mobile communication devices operating on the current communication system; skipping any channels on the grey zone channel list during scanning to avoid the grey zone condition; and acquiring a new channel from the channel scan list in response to the new channel having an associated quality indicator greater than or equal to the predetermined threshold value.

29. The method of claim 28, further comprising preventing channel hopping by receiving the second quality indicator after the predetermined time period.

* * * * *

UNITED STATES PATENT AND TRADEMARK OFFICE
CERTIFICATE OF CORRECTION

PATENT NO. : 7,299,041 B2  Page 1 of 1
APPLICATION NO. : 10/065257
DATED : November 20, 2007
INVENTOR(S) : Murali Narasimha et al.

It is certified that error appears in the above-identified patent and that said Letters Patent is hereby corrected as shown below:

Column 10, line 39, please delete "another" and insert in place thereof --the new--
Column 10, line 41, please delete "another channel of" and insert in place thereof --the new channel in--
Column 10, line 59, please delete "one" and insert in place thereof --on--
Column 10, line 67, please delete "and"
Column 11, line 62, please delete "another" and insert in place thereof --a new--

Signed and Sealed this

Twenty-fourth Day of June, 2008

JON W. DUDAS
*Director of the United States Patent and Trademark Office*